United States Patent
Yin et al.

(10) Patent No.: US 10,605,482 B2
(45) Date of Patent: Mar. 31, 2020

(54) WATER HEATER WITH DAMPER

(71) Applicant: A. O. Smith Corporation, Milwaukee, WI (US)

(72) Inventors: Jianmin Yin, Racine, WI (US); Brian Thomas Branecky, Oconomowoc, WI (US); Mark Murphy, Nashville, TN (US); Benjamin Joseph Bolton, Elm Grove, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 156 days.

(21) Appl. No.: 15/903,968

(22) Filed: Feb. 23, 2018

(65) Prior Publication Data

US 2019/0264949 A1 Aug. 29, 2019

(51) Int. Cl.
*F22B 27/00* (2006.01)
*F24H 9/20* (2006.01)
*F24H 1/10* (2006.01)
*G05D 23/19* (2006.01)

(52) U.S. Cl.
CPC ........... *F24H 1/103* (2013.01); *F24H 9/2028* (2013.01); *F24H 2250/02* (2013.01); *G05D 23/1917* (2013.01)

(58) Field of Classification Search
CPC ... F24H 9/20; F24H 1/10; F24H 9/128; F22B 27/00; F22B 35/005
See application file for complete search history.

(56) References Cited

U.S. PATENT DOCUMENTS

| | | | |
|---|---|---|---|
| 7,046,922 B1* | 5/2006 | Sturm | F24H 1/102 392/465 |
| 8,165,461 B2* | 4/2012 | Sullivan | F24H 1/142 392/465 |
| 9,167,630 B2 | 10/2015 | Seitz et al. | |
| 9,664,413 B2* | 5/2017 | Seitz | F24H 1/202 |
| 9,702,585 B2* | 7/2017 | Hayden | F24H 1/0018 |
| 9,874,373 B2* | 1/2018 | Seitz | F24H 1/202 |
| 2012/0057857 A1* | 3/2012 | Kenney | F24H 1/142 392/465 |
| 2015/0345826 A1* | 12/2015 | Lutz, II | F24H 1/102 392/490 |
| 2018/0031270 A1* | 2/2018 | Kim | F24H 1/162 |
| 2018/0163990 A1* | 6/2018 | Fabrizio | F24H 1/102 |

\* cited by examiner

*Primary Examiner* — Gregory A Wilson
(74) *Attorney, Agent, or Firm* — Michael Best & Friedrich LLP

(57) ABSTRACT

A water heater system includes a tank having internal capacity no greater than 1 gallon, a water inlet, and a water outlet. A flow of water into the tank through the water inlet and out of the tank through the water outlet is a downstream water flow. An absence of downstream water flow is a standby condition of the water heater. The water heater includes a heating element for heating water in the tank, a first temperature sensor positioned to sense a temperature of the water flowing into the tank, and a second temperature sensor positioned to sense a temperature of the water flowing out of the tank. The water heater further includes a damper upstream of the second temperature sensor to reduce fluctuations in the temperature readings of the second temperature sensor to reduce false detection of downstream water flow.

29 Claims, 7 Drawing Sheets

WATER HEATER WITH DAMPER

BACKGROUND

The present invention relates to water heaters, and more particularly to a "tankless" water heater with an electrically powered heating element and a relatively small tank for substantially instantaneous heating of water.

SUMMARY

In one embodiment, the invention provides a water heater system including a tank having internal capacity no greater than 1 gallon, a water inlet, and a water outlet. A flow of water into the tank through the water inlet and out of the tank through the water outlet is a downstream water flow. An absence of downstream water flow is a standby condition of the water heater. The water heater includes a heating element for heating water in the tank, a first temperature sensor positioned to sense a temperature of the water flowing into the tank, and a second temperature sensor positioned to sense a temperature of the water flowing out of the tank. A controller is configured to detect downstream water flow based on a relationship between temperature readings of the first and second temperature sensors and selectively energizing the heating element in response to detected downstream water flow. The water heater further includes a damper upstream of the second temperature sensor to reduce fluctuations in the temperature readings of the second temperature sensor to reduce false detection of downstream water flow.

In another embodiment the invention provides a method for reducing false detection of water flow in a water heater system including a tank having internal capacity no greater than 1 gallon, a water inlet, and a water outlet. A flow of water into the tank through the water inlet and out of the tank through the water outlet is a downstream water flow. An absence of downstream water flow is a standby condition of the water heater. The method includes monitoring by a controller temperature readings of a first temperature sensor positioned to sense a temperature of water flowing into the tank and a second temperature sensor positioned to sense a temperature of water flowing out of the tank. The method further includes detecting downstream water flow by the controller based on a relationship between the temperature readings of the first and second temperature sensors, selectively energizing a heating element in response to detected downstream water flow, and reducing fluctuation in the temperature readings of the second temperature sensor using a damper for reducing false detection of downstream water flow.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
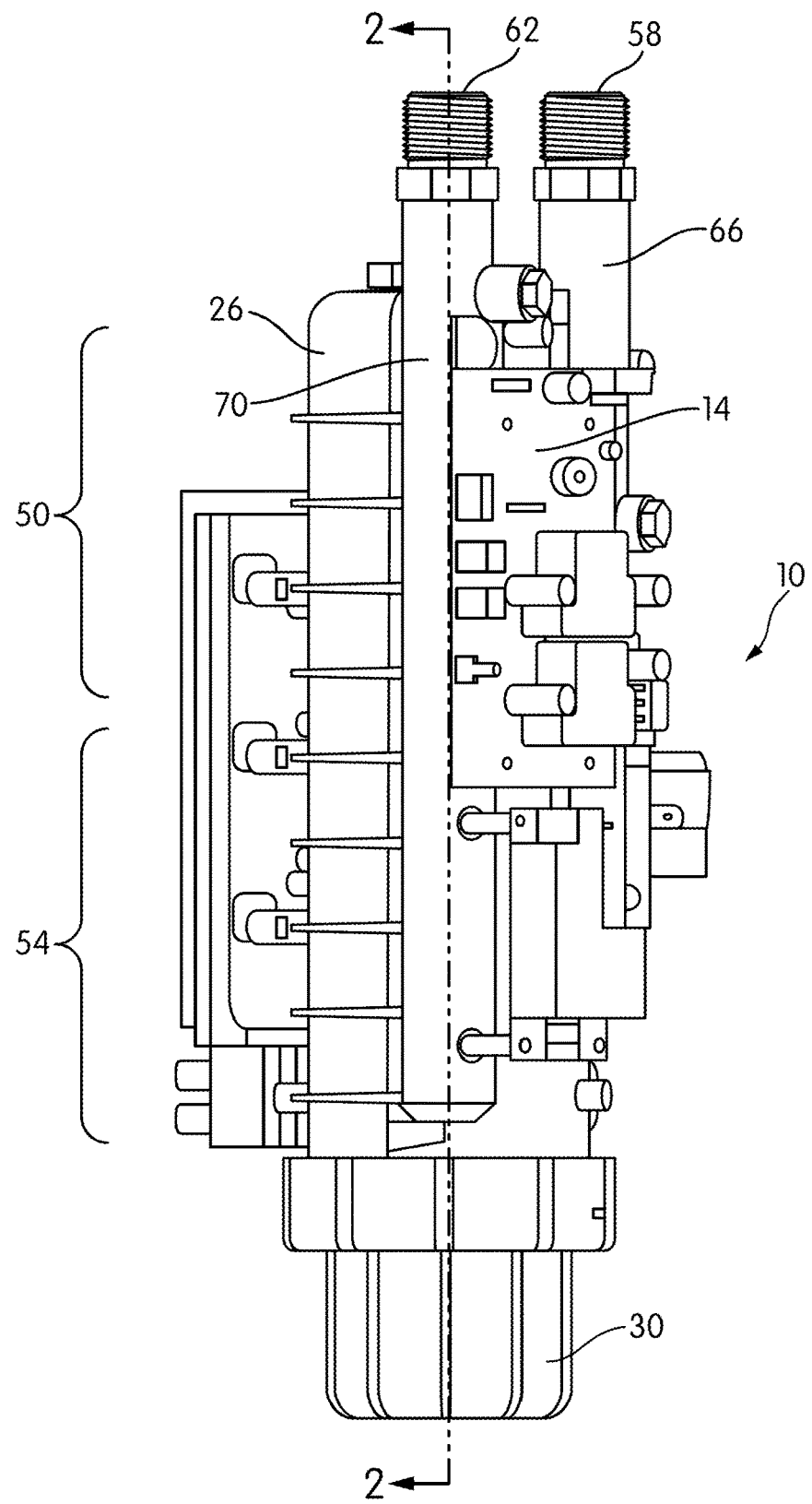
FIG. 1 is a side view of a tankless water heater.

FIG. 1 illustrates one embodiment of a water heater 10 as described in U.S. Pat. No. 9,167,630, the entire contents of which being incorporated herein by reference. The illustrated water heater 10 includes a generally cylindrical tank 14 having an internal chamber 18 (FIG. 2) therein. The internal chamber 18 has a capacity that is relatively small for a water heater, allowing the water heater 10 to perform as a "tankless" water heater 10. More specifically, the illustrated water heater 10 has an internal capacity no greater than 1 gallon. In other embodiments, the internal capacity may have a range of 0.5 gallons to 1.5 gallons.

Figure 2:
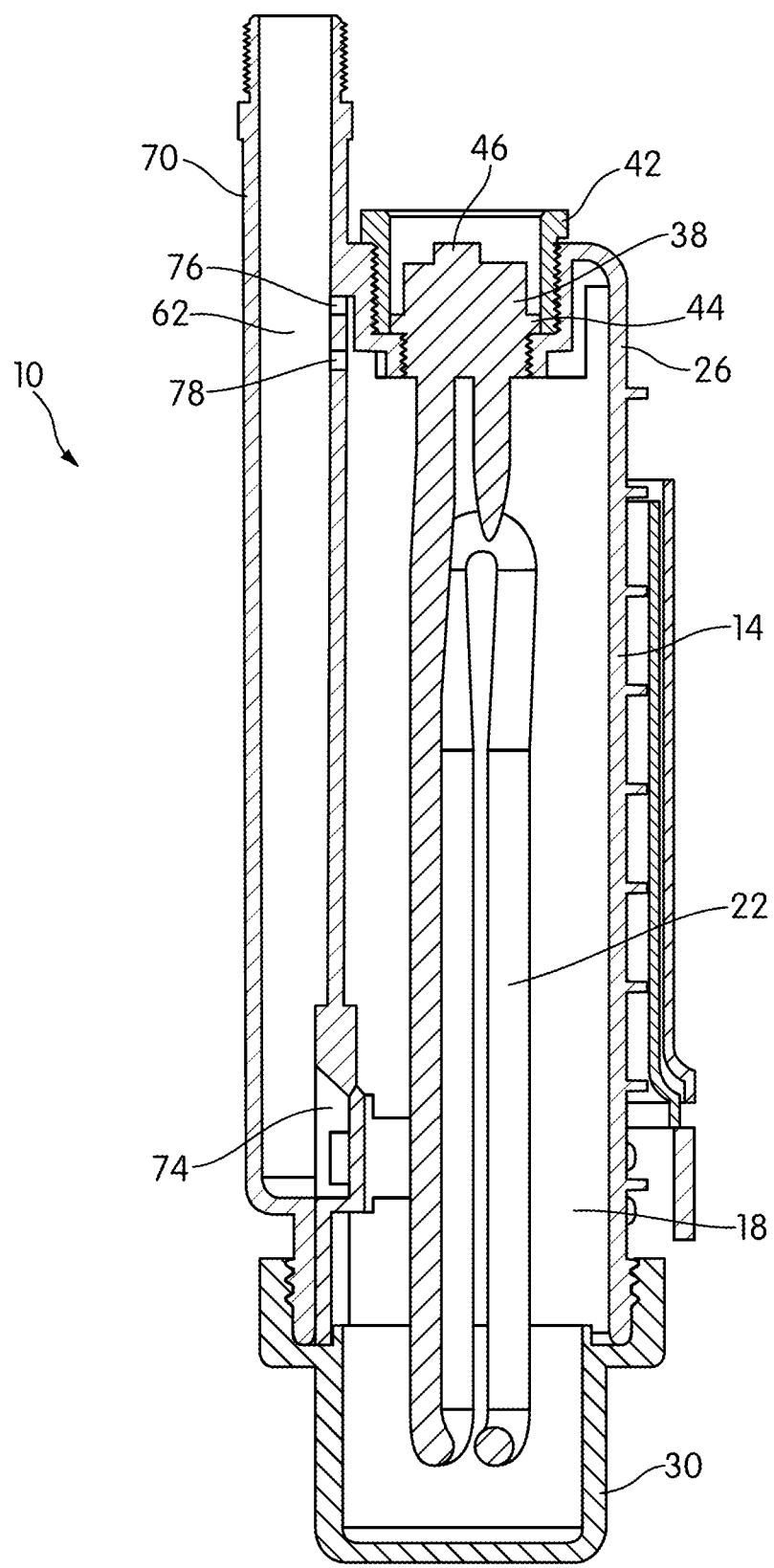
FIG. 2 is a cross-sectional view of the water heater of FIG. 1 taken along lines 2-2.

As shown in FIG. 2, one or more heating elements 22 are provided within the internal chamber 18. The heating element 22 extends from an upper end 26 towards a lower end 30 of the tank 14. The illustrated tank 14 includes an opening positioned at the upper end 26. The heating element 22 extends through the opening and into the tank 14. The water heater 10 includes a head 38, a cap 42, and a sealing element 44 for supporting the heating element 22 at the upper end 26. The cap 42 includes threads corresponding to threads of the opening. The cap 42 is configured to threadably couple the heating element 22 and the tank 14. The sealing element 44 is positioned between the head 38 and the cap 42.

The heating element 22 is configured to heat the water within the tank 14. In the illustrated embodiment, electrical power to the heating element 22 is provided through terminals 46 positioned on the head 38 (FIG. 2) such that the heating element 22 is an electric heating element 22. With reference to FIG. 1, the water in an upper portion 50 of the tank 14 may increase in temperature relatively more quickly than the water in a lower portion 54 due to the position of the heating element 22. Water movement within the tank 14 due to natural convection creates a temperature distribution around the heating element 22 in the tank 14. Water having a higher temperature rises towards the upper end 26 and the water having a lower temperature sinks towards the lower end 30. The water in the upper portion 50 may, due to residual heat remaining in the water, have a higher temperature than the water in the lower portion 54 regardless if the heating element 22 is energized or deenergized.

Figure 3:
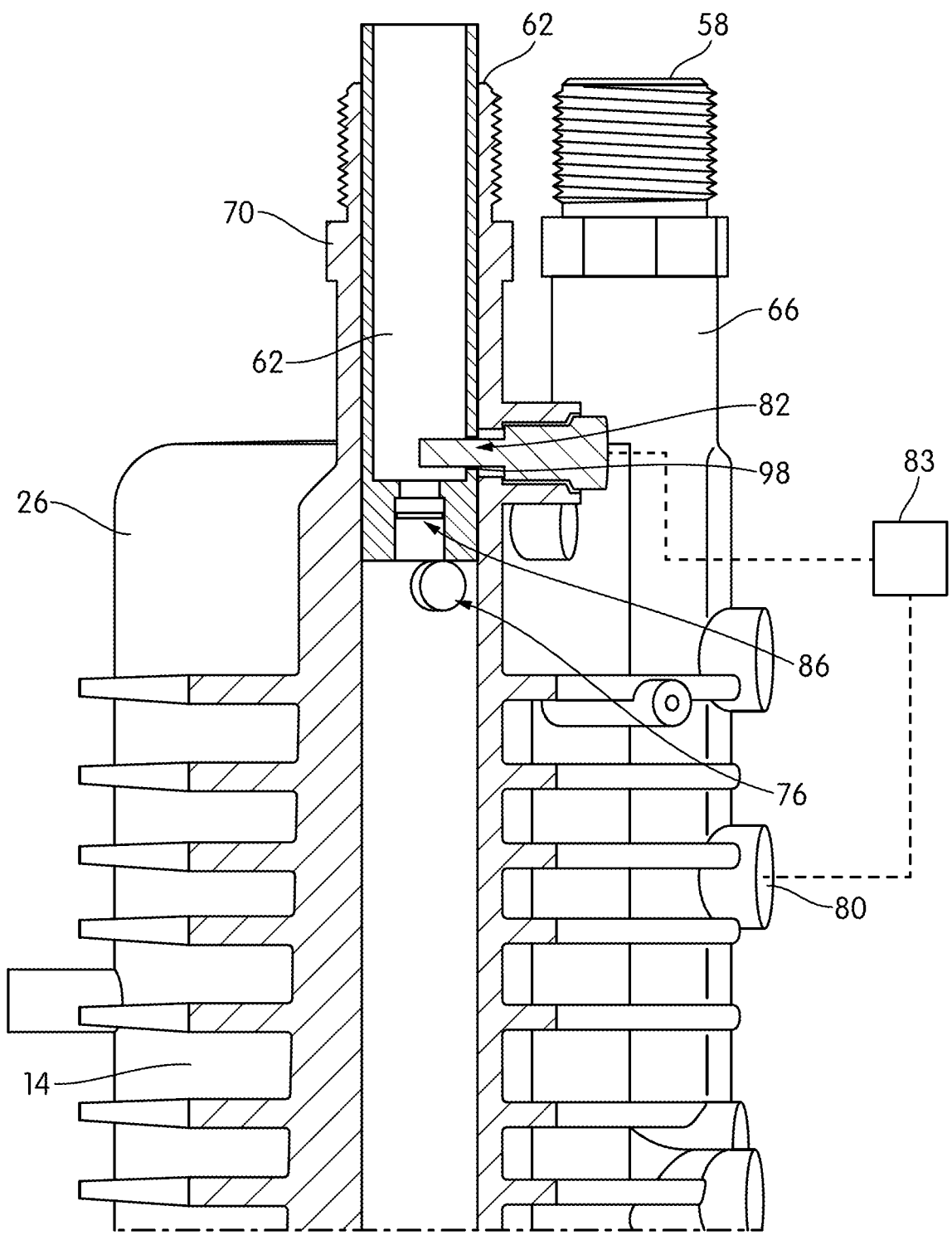
FIG. 3 is a partial, cross-sectional view of the water outlet of the water heater of FIG. 1.

With reference to FIGS. 1-3, the water heater 10 further includes a water inlet 58 and a water outlet 62, both in fluid communication with the tank 14. The illustrated water inlet 58 includes a water inlet pipe 66 for providing a flow of water into the tank 14. The illustrated water outlet 62 includes a water outlet pipe 70 for a flow of water out of the tank 14. The water inlet pipe 66 and the water outlet pipe 70 extend from the tank 14 and generally parallel to each other. A flow of water into the tank 14 through the water inlet 58 and out of the tank 14 through the water outlet 62 is defined as being a downstream water flow. An upstream direction is defined as opposite the downstream water flow.

The water outlet pipe 70 communicates with the lower portion 54 of the tank 14 through a lower aperture 74 and communicates with the upper portion 50 through an upper aperture 78. The water outlet pipe 70 is configured to mix the cooler water from the lower portion 54 with the hotter water from the upper portion 50 when water is drawn from the tank 14. The water outlet pipe 70 also includes a vent hole 76 positioned above the upper aperture 78. The vent hole 76 is configured to allow noncondensible gases/air to escape from the internal chamber 18 through the water outlet pipe 70. In addition, the hot water inside the tank 14 can also pass through this vent hole 76 due to downstream water flow or hot water convection inside the tank 14.

Downstream water flow occurs when water is being drawn from the tank 14 through the water outlet pipe 70 (i.e., when a faucet is turned on). A hot water draw occurs when there is downstream water flow. The heating element 22 is configured to be energized during a hot water draw, to heat the water before it leaves the tank 14. Conversely, the water heater 10 is in a standby mode or condition when water is not being drawn from the tank 14 (i.e., in the absence of downstream water flow). The heating element 22 is configured to be deenergized when the water heater 10 is in the standby condition.

With reference to FIG. 3, a first temperature sensor 80 is positioned within or proximate the water inlet 58 (i.e., within the water inlet pipe 66) to sense a temperature of the water flowing into the tank 14. A second temperature sensor 82 is positioned within or proximate the water outlet 62 and configured to sense a temperature of the water flowing out of the tank 14. The water heater 10 includes a controller 83 (shown schematically in FIG. 3) coupled to the first and second temperature sensors 80, 82 for monitoring temperatures readings of the first and second temperature sensors 80, 82. The controller 83 is operable to identify downstream water flow based on the temperature readings. More specifically, the controller 83 monitors the temperature readings over time to indicate downstream water flow or an absence of downstream water flow, as further discussed below. In the illustrated embodiment, the controller 83 is configured to measure the temperature readings in 0.5 second intervals.

The controller 83 is further connected to the heating element 22 for selectively energizing the heating element 22. Specifically, the controller 83 is configured to operate (i.e. energize) the heating element 22 based on the changes in the temperature readings of the first and second temperature sensors 80, 82 representative of the downstream water flow.

Downstream water flow may be determined by changes in temperature of the water in the water inlet 58 and/or the tank 14, water outlet 62, or a comparison of the temperature readings of the water inlet 58 and/or tank 14 and the water outlet 62. For example, when there is downstream water flow (i.e., during the hot water draw), the temperature readings of the first and second temperature sensors 80, 82 will change quickly (e.g., converge towards substantially the same temperature) at the same time interval. The controller 83 is configured to detect this temperature change and determine that there is downstream water flow and energize the heating element 22. As such, the controller 83 is operable to detect downstream water flow based on a relationship (i.e., comparison) between the temperature readings of the first and the second temperature sensors 80, 82 and selectively energize the heating element 22 in response to detected downstream water flow.

Figure 5:
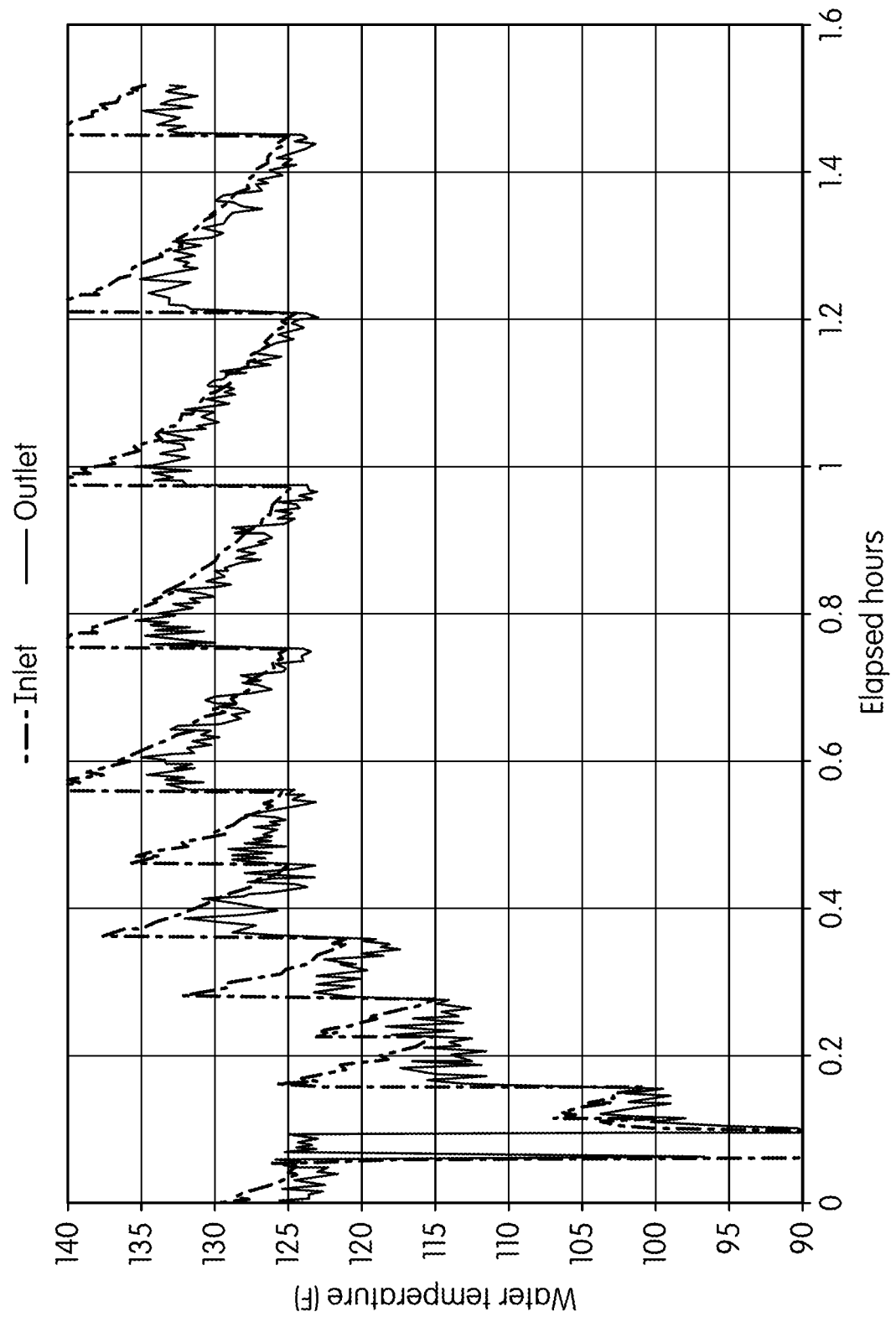
FIG. 5 is a graph illustrating water temperature readings of first and second temperature sensors positioned at a water inlet and the water outlet varying with time.

At the end of the hot water draw, the downstream water flow stops and the heating element 22 remains energized. As shown in FIG. 5, when the water heater 10 enters the standby condition, the temperature reading of the first temperature sensor 80 may increase relatively quickly compared to the temperature reading of the second temperature sensor 82. This may be due to the positioning of the first temperature sensor 80 and hot water thermal expansion. Specifically, a "sudden" jump of the temperature reading of the first temperature sensor 80 indicates to the controller that the downstream water flow has stopped. For example, as shown in FIG. 5, the "sudden" jump is about five degrees Fahrenheit increase within 0.5 seconds. The controller 83 detects this "sudden" temperature difference (i.e., jump or increase in temperature of the first temperature sensor 80) and deenergizes the heating element 22. Because energy is arguably wasted when the heating element 22 is on in the absence of downstream water flow, the speed at which the controller 83 can determine there is no downstream water flow and deenergize the heating element 22 can be a factor in the water heater's efficiency.

The sensitivity of the controller 83 may be stated in terms of the lowest water flow rate that it can accurately detect by comparing temperature readings of the first and second temperature sensors 80, 82. For example, the lowest detectable flow rate may be no less than 0.5 gallons per minute, in which case the controller 83 would have a sensitivity of 0.5 gpm.

But sensitivity of the controller 83 may vary depending on conditions. For example, the controller 83 may be more "sensitive" to the changes in the temperature readings when the water heater 10 is in the standby condition just after the end of a hot water draw. This is due to the temperature readings being relatively close to each other (i.e., plus or minus 5 degrees Fahrenheit), and also close to a set point temperature of the water heater 10, immediately after the end of the hot water draw. In such circumstances, the controller 83 may falsely detect the convergence of the temperature readings due to noise in a signal output of the temperature readings, the escaping gases from the hot water in the tank 14 through the vent hole 76, and/or the water movement in the tank 14 from natural convection creating fluctuations in the temperature readings. The fluctuations may cause the temperature readings to appear to be converging such that the controller 83 falsely detects downstream water flow. The problem of false detection of downstream water flow is further exacerbated by the controller 83 energizing the heating element 22 in response to falsely detecting the downstream water flow. When the controller 83 energizes the heating element 22 under such conditions, the heat input from the heating element 22 causes even more temperature fluctuations in the water. As such, it is advantageous to inhibit convergence of the temperature readings in the absence of downstream water flow.

With continued reference to FIG. 5, continuous activation and deactivation of the heating element 22 may cause the controller 83 to consistently indicate (i.e., repeat) the false detection of downstream water flow by the fluctuations in the temperature readings such that the water heater 10 operates in a cycle or series of false detections. The efficiency of the water heater 10 may decrease considerably as a consequence of cycling the heating element 22 on and off in response to such false detections during a long period of no actual downstream water flow.

With reference to FIG. 3, the water heater 10 eliminates or minimizes false water flow detections with a damper 86 positioned in the water outlet 62 upstream of the second temperature sensor 82. Another damper (not shown) may also be positioned downstream of the second temperature sensor 82 within the water outlet 62. In some embodiments, if the water outlet pipe 62 is positioned vertically (i.e., the water heater 10 extends in a vertical direction), the damper 86 may be positioned below and/or above the temperature sensor 82 within the water outlet 62. The water inlet 58 may also include a damper such as a heat trap upstream of the first temperature sensor 80 in the water inlet 58. The damper 86 and possible other dampers are configured to alter the relationship between the temperature readings and/or reduce fluctuations in the temperature readings during the standby condition for reducing false detection of downstream water flow, as further discussed below.

Figure 4:
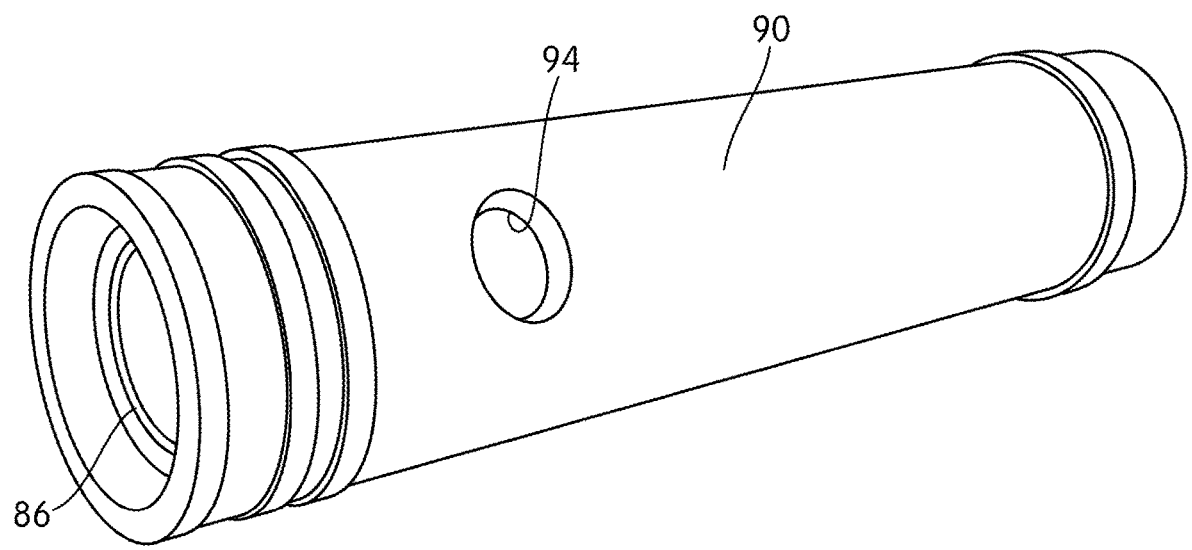
FIG. 4 is a perspective view of an insert for positioning a damper within the water outlet.

With reference to FIG. 4, the water heater 10 may further include an insert 90 for positioning the damper 86 within the water outlet 62. The insert 90 includes the damper 86 and an aperture 94. A hole 98 (FIG. 3) defined by the water outlet pipe 70 corresponds to the aperture 94 of the insert 90 for insertion of the second temperature sensor 82 into the water outlet 62. The insert 90 is inserted into the water outlet pipe 70 downstream of the vent hole 76 such that the damper 86 is between the water/gases exiting the tank 14 and the second temperature sensor 82. Specifically, the damper 86 forms a seal or check valve within the insert 90 for separating the second temperature sensor 82 from the water/gases within the tank 14 in the absence of downstream water flow. An intentional leak path, or bypass channel (not shown), may form between the insert 90 and the water outlet pipe 70 for maintaining a minimum pressure (e.g., 0.5 pounds per square inch) at which the damper 86 opens such that the second temperature sensor 82 may be slowly introduced to water pressure changes occurring within the tank 14 due to natural convection. This may reduce fluctuations in the temperature readings of the second temperature sensor 82.

With reference to FIGS. 3 and 4, the damper 86 is configured as a one-way valve operable to move between an open position when there is downstream water flow and a closed position when there is no downstream water flow. In other words, the damper 86 moves from the open position to the closed position at the end of the hot water draw. As such, the one-way valve is adapted to buffer the second temperature sensor 82 from sensing a rate of water temperature change similar to the first temperature sensor 80 when in the closed position. More specifically, the damper 86 separates the second temperature sensor 82 from the first temperature sensor 80 when in the closed position such that damper 86 may promote divergence of the temperature readings of the first and second temperature sensors 80, 82 between the end of the hot water draw and the standby condition.

The damper 86 may be further configured as a heat trap when in the closed position for insulating the water outlet 62 from the tank 14 when there is no downstream water flow. Specifically, the heat trap provides a thermal barrier between the first and second temperature sensors 80, 82 for buffering the second temperature sensor 82 from sensing a rate of water temperature change similar to the first temperature sensor 80 when the heat trap is in the closed position. This may also promote and maintain the divergence of temperature readings of the first and second temperature sensors 80, 82.

As such, the damper 86 creates a more consistent and relatively larger temperature difference between the temperature readings of the first and second temperature sensors 80, 82. The closed position of the damper 86 may also reduce fluctuation in the temperature reading of the second temperature sensor 82 regardless if the heating element 22 is energized or deenergized.

Figure 6:
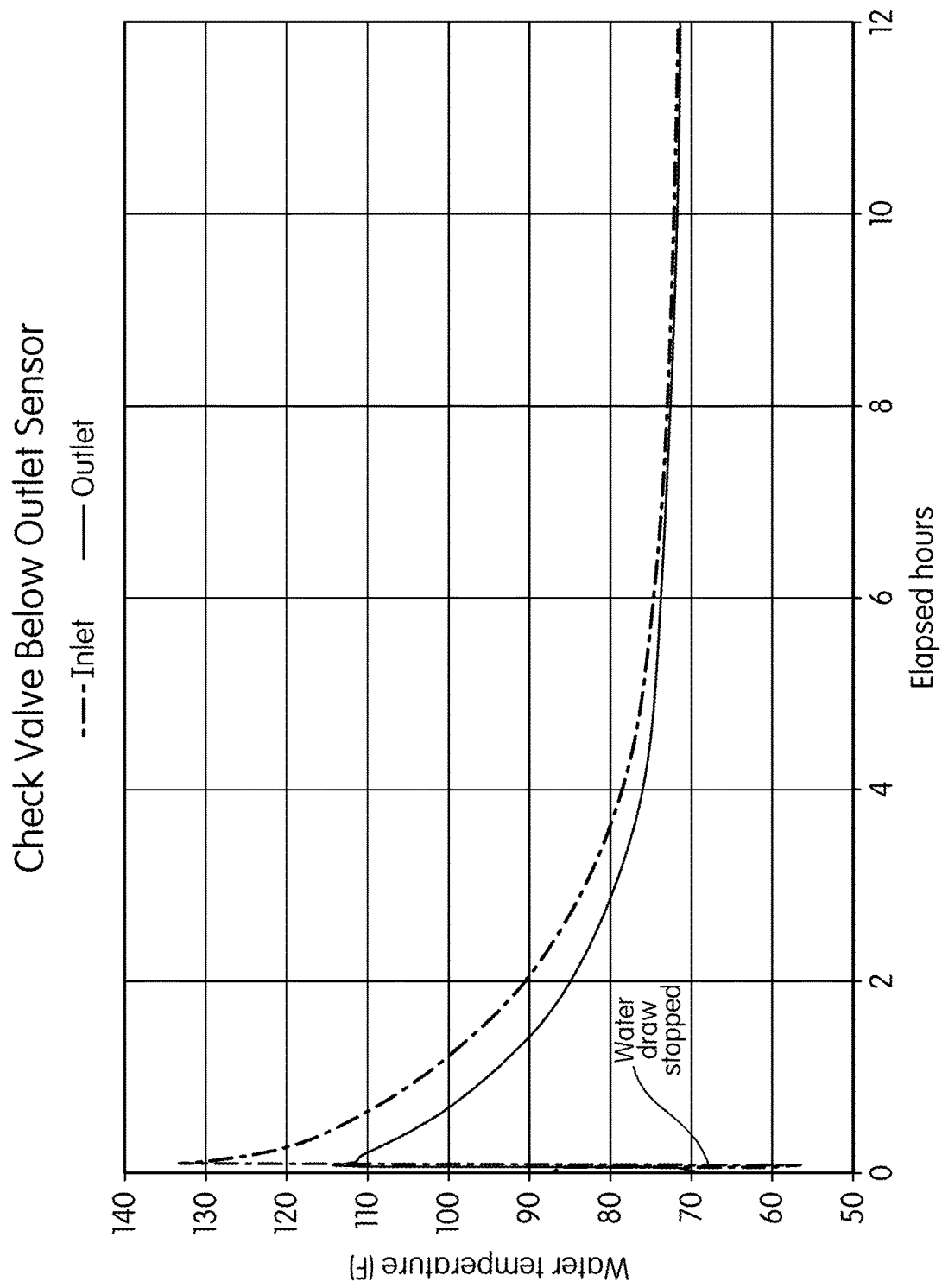
FIG. 6 is another graph illustrating the water temperature readings of the first and second temperature sensors varying with time having the damper positioned downstream of the second temperature sensor.

For example, as shown in FIG. 6, the damper 86 is positioned upstream of the second temperature sensor 82. When the elapsed time approximately equals zero hours, the temperature reading of the first temperature sensor 80 increases relatively quickly compared to the temperature reading of the second temperature sensor 82, indicating to the controller 83 that the downstream water flow just stopped. Specifically, the damper 86 consistently gives rise to a temperature difference no less than 10 degrees Fahrenheit between the temperature readings of the first and second temperature sensors 80, 82 at the end of the hot water draw. As such, the temperature readings start at considerably different temperatures, and decrease at relatively different rates. The controller deenergizes the heating element 22 when no downstream water flow is detected.

As discussed above, it is beneficial to create a consistent and relatively large temperature difference (i.e., plus or minus 10 instead of plus or minus 5 degrees Fahrenheit) between the temperature readings such that the controller 83 may more accurately detect when the water heater 10 changes from the standby condition to the start of the hot water draw (i.e., when there is downstream water flow again). Specifically, the temperatures of the first and second temperature sensors 80, 82 converge towards substantially the same temperature when there is downstream water flow. The convergence of temperatures is exaggerated due to the consistent and relatively large temperature difference created by the damper 86. As such, the damper 86 is configured to create a "sudden" rate of water temperature change at the first and second temperature sensors 80, 82 when there is downstream water flow again. In response to detecting a convergence of temperatures at the first and second temperature sensors 80, 82, the controller 83 determines that there is downstream water flow and energizes the heating element 22.

With further reference to FIG. 6, a signal output of the second temperature sensor 82 is relatively "smooth" (i.e., less fluctuation) as compared to the signal output of the temperature readings in FIG. 5. The reduction in fluctuations in the temperature readings of the second temperature sensor 82 using the damper 86 minimizes or eliminates false detection of downstream water flow. Specifically, the noise in the signal output of the temperature readings of at least the second temperature sensor 82 is reduced such that the temperatures at the temperature sensors 80, 82 do not falsely appear to converge.

The water heater 10 may be less "sensitive" to the changes in temperature by using the damper 86 such that the detection of downstream water flow may be accurately determined. Moreover, the lowest detectable flow rate may now be no greater than 0.3 gallons per minute by using the damper 86 such that the controller 83 has a sensitivity of about 0.3 gpm or less. As such, the damper 86 is configured to increase the sensitivity of the controller 83 such that the controller 83 may be able to accurately detect downstream water flow representative of smaller water draws.

Figure 7:
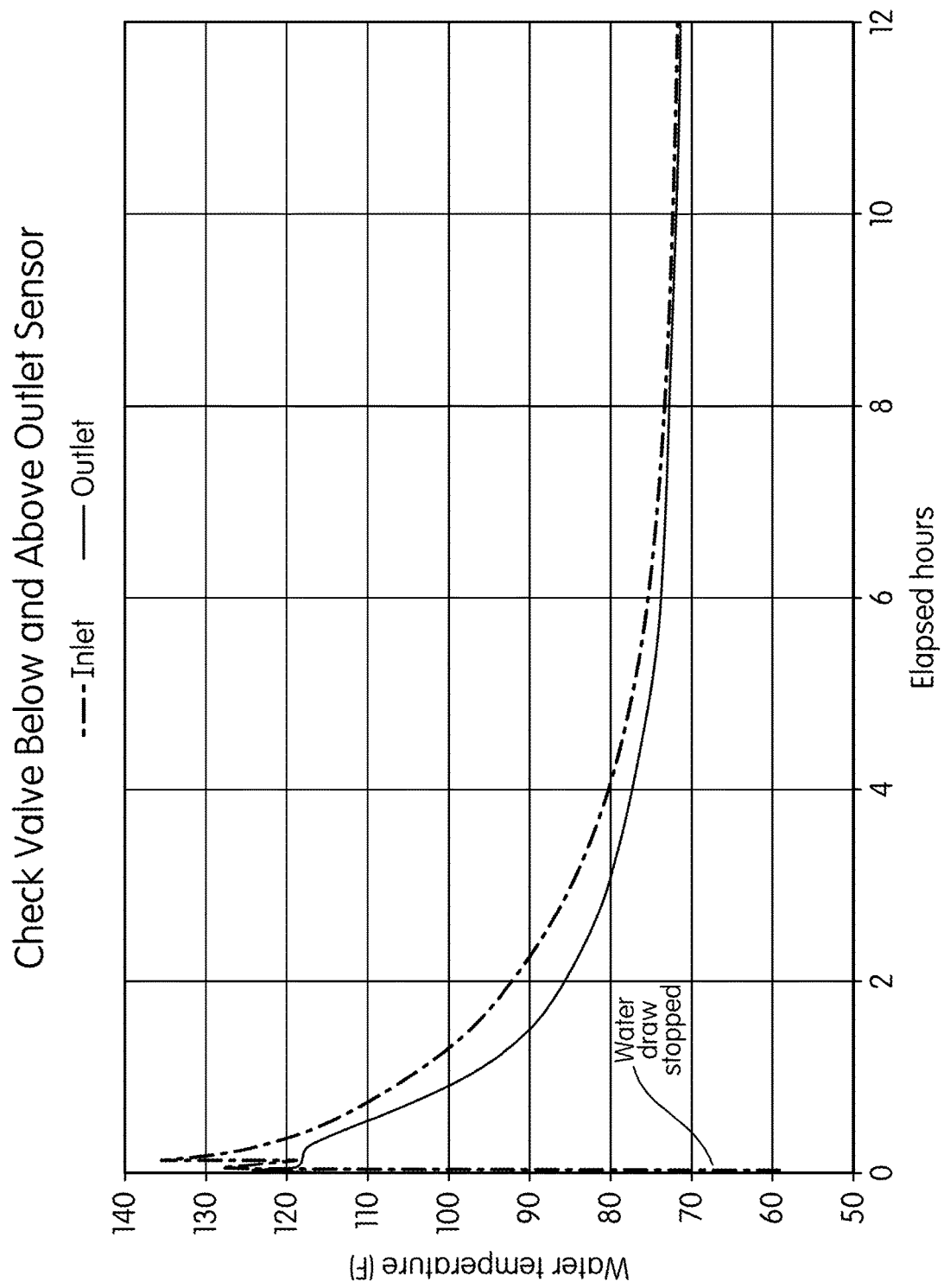
FIG. 7 is yet another graph illustrating the water temperature readings of the first and second temperature sensors varying with time having two dampers positioned downstream and upstream of the second temperature sensor.

In another example, as shown in FIG. 7, the damper 86 is positioned downstream of the second temperature sensor 82 and another damper is positioned upstream of the second temperature sensor 82. The damper 86 creates a more consistent and a relatively large temperature difference no less than plus or minus 10 degrees Fahrenheit between the temperature readings of the first and second temperature sensors 80, 82 at the end of the hot water draw. Moreover, the signal output of the second temperature sensor 82 is relatively more "smooth" as compared to the signal output of the temperature readings in FIGS. 5 and 6. Furthermore, the other damper alters the rate of water temperature change of the second temperature sensor 82 still more compared to the rate of water temperature change of the first temperature sensor 80 such that the temperature difference is even more evident to the controller 83 during the standby condition. As such, the damper 86 and the other damper are configured to alter the relationship between the temperature readings than as shown in FIG. 6. This alteration may create the relatively large and consistent temperature difference between the temperature readings such that the controller 83 may be able to detect even smaller sudden changes in the temperature readings of the first and second temperature sensors 80, 82 relative to each other. As such, the controller 83 may be able to detect downstream water flow representative of even smaller water draws.

Therefore, the damper 86 is configured to alter the relationship between the temperature readings by creating a consistent and relatively large temperature difference between the temperature readings of the first and second temperature sensors 80, 82. This relationship created by the damper 86 is used to indicate downstream water flow for accurately activating the heating element 22 by the controller 83 when water is being drawn from the tank 14. Positioning another damper 86 downstream of the second temperature sensor 82 and/or another heat trap upstream of the first temperature sensor 80 may further alter the relationship between the temperature readings such that the heating element 22 can be more accurately activated. As such, the water heater 10 may be able to detect smaller temperature changes representative of small water draws. Depending on what degree of sensitivity the water heater 10 needs to have in order to detect small water draws, different combinations of the damper 86 can be applied to the first and second temperature sensors 80, 82, such as the one-way valve/heat trap upstream or downstream of the second temperature sensor 82, or other dampers operating as a heat traps upstream or downstream of the first temperature sensor 80. Furthermore, the damper 86 and possible other dampers may reduce short term standby energy losses by reducing fluctuations in the temperature readings.

Various features and advantages of the invention are set forth in the following claims.

What is claimed is:

1. A water heater system comprising:
a tank having internal capacity no greater than 1 gallon and including a water inlet and a water outlet, a flow of water into the tank through the water inlet and out of the tank through the water outlet being a downstream water flow, an absence of downstream water flow being a standby condition of the water heater;
a heating element for heating water in the tank;
a first temperature sensor positioned to sense a temperature of the water flowing into the tank;
a second temperature sensor positioned to sense a temperature of the water flowing out of the tank;
a controller configured to detect downstream water flow based on a relationship between temperature readings of the first and second temperature sensors and selectively energizing the heating element in response to detected downstream water flow; and
a damper upstream of the second temperature sensor to reduce fluctuations in the temperature readings of the second temperature sensor to reduce false detection of downstream water flow;
wherein the damper is configured as a heat trap operable in an open position when exposed to downstream water flow and a closed position in the standby condition, the heat trap providing a thermal barrier between the first and second temperature sensors for buffering the second temperature sensor from sensing a rate of water temperature change similar to the first temperature sensor when the heat trap is in the closed position.

2. The water heater system of claim 1, wherein the second temperature sensor is in the water outlet.

3. The water heater system of claim 1, wherein the first temperature sensor is in the water inlet.

4. The water heater system of claim 1, wherein the damper promotes a divergence in the temperature readings between the first and second temperature sensors between an end of a hot water draw and the standby condition.

5. The water heater system of claim 4, wherein the damper is configured to create a consistent and relatively large temperature difference between the temperature readings of the first and second temperature sensors at the end of a hot water draw.

6. The water heater system of claim 5, wherein the relatively large temperature difference is no less than plus or minus 10 degrees Fahrenheit.

7. The water heater system of claim 5, wherein the controller detects the temperature difference and deenergizes the heating element.

8. The water heater of claim 4, wherein the damper is configured to create a sudden rate of water temperature change of the temperature readings of the first and second temperature sensors when there is downstream water flow.

9. The water heater of claim 8, wherein the temperature readings of the first and second temperature sensors are substantially the same after the sudden rate of water temperature change, and wherein the controller energizes the heating element after detecting the substantially the same temperature readings.

10. The water heater system of claim 1, further comprising an insert within the water outlet, and wherein the insert includes the damper and the second temperature sensor.

11. A water heater system comprising:
a tank having internal capacity no greater than 1 gallon and including a water inlet and a water outlet, a flow of water into the tank through the water inlet and out of the tank through the water outlet being a downstream water flow, an absence of downstream water flow being a standby condition of the water heater;
a heating element for heating water in the tank;
a first temperature sensor positioned to sense a temperature of the water flowing into the tank;
a second temperature sensor positioned to sense a temperature of the water flowing out of the tank;
a controller configured to detect downstream water flow based on a relationship between temperature readings of the first and second temperature sensors and selectively energizing the heating element in response to detected downstream water flow; and
a damper upstream of the second temperature sensor to reduce fluctuations in the temperature readings of the second temperature sensor to reduce false detection of downstream water flow;
wherein the damper is configured to increase sensitivity of the controller such that the controller is configured to detect downstream water flow of about 0.3 gallons per minute.

12. The water heater system of claim 11, wherein the damper is configured as a one-way valve operable in an open position when exposed to downstream water flow and a closed position in the standby condition, the one-way valve buffering the second temperature sensor from sensing a rate of water temperature change similar to the first temperature sensor when the one-way valve is in the closed position.

13. The water heater system of claim 11, wherein the damper is configured as a heat trap operable in an open position when exposed to downstream water flow and a closed position in the standby condition, the heat trap providing a thermal barrier between the first and second temperature sensors for buffering the second temperature sensor from sensing a rate of water temperature change similar to the first temperature sensor when the heat trap is in the closed position.

14. The water heater system of claim 11, further comprising an insert within the water outlet, and wherein the insert includes the damper and the second temperature sensor.

15. A water heater system comprising:
a tank having internal capacity no greater than 1 gallon and including a water inlet and a water outlet, a flow of water into the tank through the water inlet and out of the tank through the water outlet being a downstream water flow, an absence of downstream water flow being a standby condition of the water heater;
a heating element for heating water in the tank;
a first temperature sensor positioned to sense a temperature of the water flowing into the tank;
a second temperature sensor positioned to sense a temperature of the water flowing out of the tank;
a controller configured to detect downstream water flow based on a relationship between temperature readings of the first and second temperature sensors and selectively energizing the heating element in response to detected downstream water flow;
a first damper upstream of the second temperature sensor to reduce fluctuations in the temperature readings of the second temperature sensor to reduce false detection of downstream water flow; and
a second damper downstream of the second temperature sensor to alter the relationship between the temperature readings of the first and second temperature sensors during the standby condition.

16. The water heater system of claim 15, wherein the second damper is configured as at least one of a one-way valve and a heat trap.

17. The water heater system of claim 15, wherein the first damper is configured as a one-way valve operable in an open position when exposed to downstream water flow and a closed position in the standby condition, the one-way valve buffering the second temperature sensor from sensing a rate of water temperature change similar to the first temperature sensor when the one-way valve is in the closed position.

18. The water heater system of claim 15, wherein the first damper is configured as a heat trap operable in an open position when exposed to downstream water flow and a closed position in the standby condition, the heat trap providing a thermal barrier between the first and second temperature sensors for buffering the second temperature sensor from sensing a rate of water temperature change similar to the first temperature sensor when the heat trap is in the closed position.

19. The water heater system of claim 15, further comprising an insert within the water outlet, and wherein the insert includes the first damper and the second temperature sensor.

20. A water heater system comprising:
a tank having internal capacity no greater than 1 gallon and including a water inlet and a water outlet, a flow of water into the tank through the water inlet and out of the tank through the water outlet being a downstream water flow, an absence of downstream water flow being a standby condition of the water heater;
a heating element for heating water in the tank;
a first temperature sensor positioned to sense a temperature of the water flowing into the tank;
a second temperature sensor positioned to sense a temperature of the water flowing out of the tank;
a controller configured to detect downstream water flow based on a relationship between temperature readings of the first and second temperature sensors and selectively energizing the heating element in response to detected downstream water flow;
a damper upstream of the second temperature sensor to reduce fluctuations in the temperature readings of the second temperature sensor to reduce false detection of downstream water flow; and
a heat trap upstream of the first temperature sensor to alter the relationship between the temperature readings of the first and second temperature sensors during the standby condition.

21. The water heater system of claim 20, wherein the damper is configured as a one-way valve operable in an open position when exposed to downstream water flow and a closed position in the standby condition, the one-way valve buffering the second temperature sensor from sensing a rate of water temperature change similar to the first temperature sensor when the one-way valve is in the closed position.

22. The water heater system of claim 20, wherein the damper is configured as a heat trap operable in an open position when exposed to downstream water flow and a closed position in the standby condition, the heat trap providing a thermal barrier between the first and second temperature sensors for buffering the second temperature sensor from sensing a rate of water temperature change similar to the first temperature sensor when the heat trap is in the closed position.

23. The water heater system of claim 20, further comprising an insert within the water outlet, and wherein the insert includes the damper and the second temperature sensor.

24. A method for reducing false detection of water flow in a water heater system including a tank having internal capacity no greater than 1 gallon and including a water inlet and a water outlet, a flow of water into the tank through the water inlet and out of the tank through the water outlet being a downstream water flow, an absence of downstream water flow being a standby condition of the water heater, the method comprising:
monitoring by a controller temperature readings of a first temperature sensor positioned to sense a temperature of water flowing into the tank and a second temperature sensor positioned to sense a temperature of water flowing out of the tank;
detecting downstream water flow by the controller based on a relationship between the temperature readings of the first and second temperature sensors;
selectively energizing a heating element in response to detected downstream water flow; and
reducing fluctuation in the temperature readings of the second temperature sensor using a damper for reducing false detection of downstream water flow.

25. The method of claim 24, wherein the damper is configured as a one-way valve operable in an open position when exposed to downstream water flow and a closed position in the standby condition, the method further comprising buffering the second temperature sensor from sensing a rate of water temperature change similar to the first temperature sensor when the one-way valve is in the closed position.

26. The method of claim 24, wherein the damper is configured as a heat trap operable in an open position when exposed to downstream water flow and a closed position in the standby condition, the heat trap providing a thermal barrier in the closed position, method further comprising buffering the second temperature sensor from sensing a rate of water temperature change similar to the first temperature sensor when the heat trap is in the closed position.

27. The method of claim 24, further comprising promoting a divergence in temperatures between the first and second temperature sensors using the damper between an end of a hot water draw and a stand by condition.

28. The method of claim 24, wherein the damper is configured to create a consistent and relatively large temperature difference between the temperature readings of the first and second temperature sensors at the end of a hot water draw.

29. The water heater system of claim 28, wherein the relatively large temperature difference is no less than plus or minus 10 degrees Fahrenheit.

* * * * *